Dec. 10, 1968  J. F. NUNES, JR  3,415,399
PALLET CARRIER VEHICLE FOR MOBILIZED LOADING OF SAME
Filed April 3, 1967  5 Sheets-Sheet 2
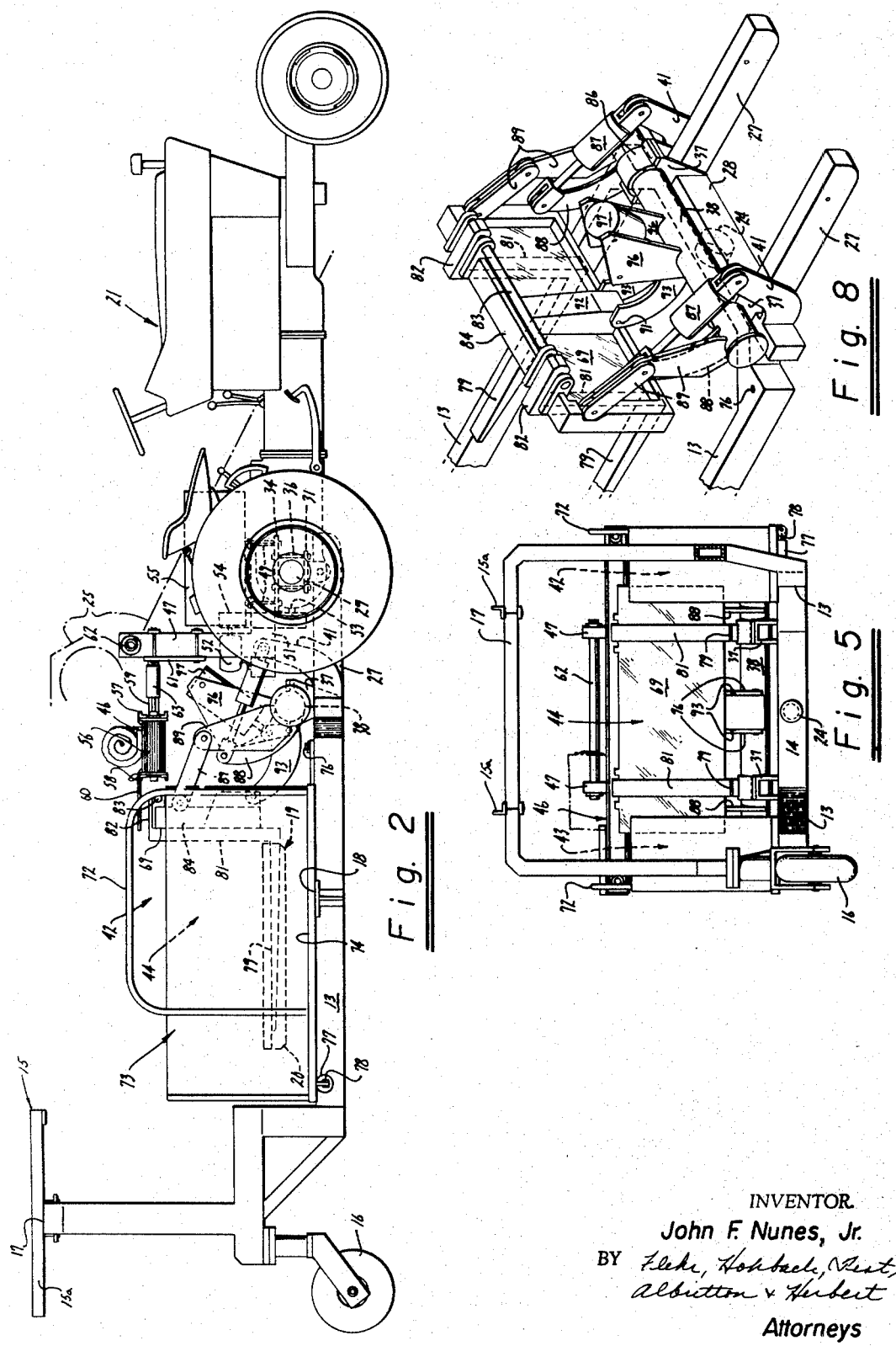
INVENTOR.
John F. Nunes, Jr.
BY Fehr, Hohbach, West,
Albritton & Herbert
Attorneys Dec. 10, 1968   J. F. NUNES, JR   3,415,399
PALLET CARRIER VEHICLE FOR MOBILIZED LOADING OF SAME
Filed April 3, 1967   5 Sheets-Sheet 3
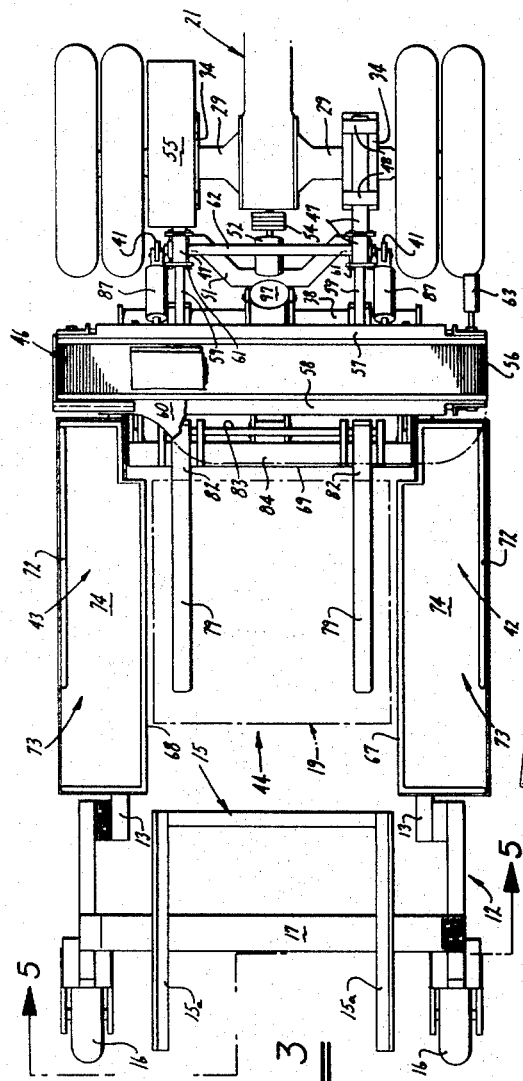
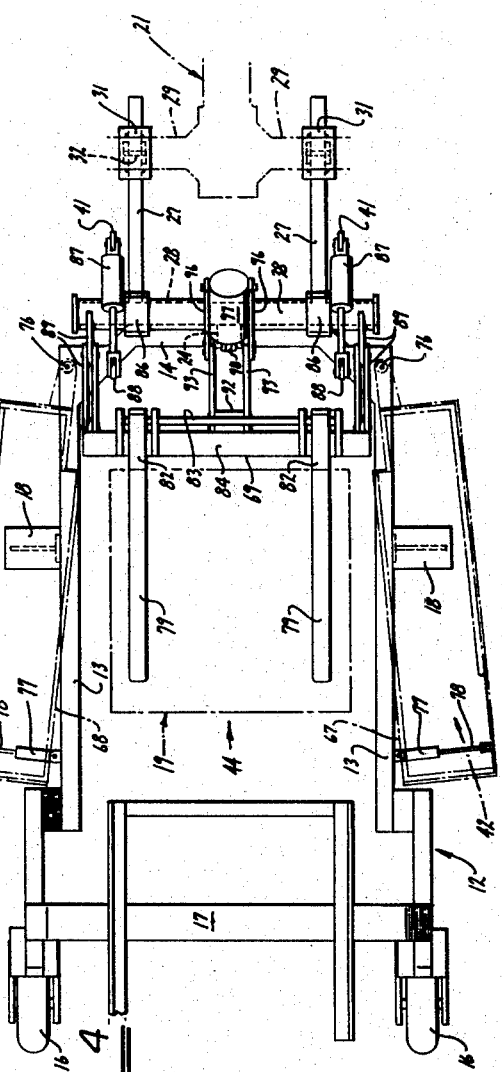
INVENTOR.
John F. Nunes, Jr.
BY
Attorneys Dec. 10, 1968   J. F. NUNES, JR   3,415,399
PALLET CARRIER VEHICLE FOR MOBILIZED LOADING OF SAME
Filed April 3, 1967                              5 Sheets-Sheet 4

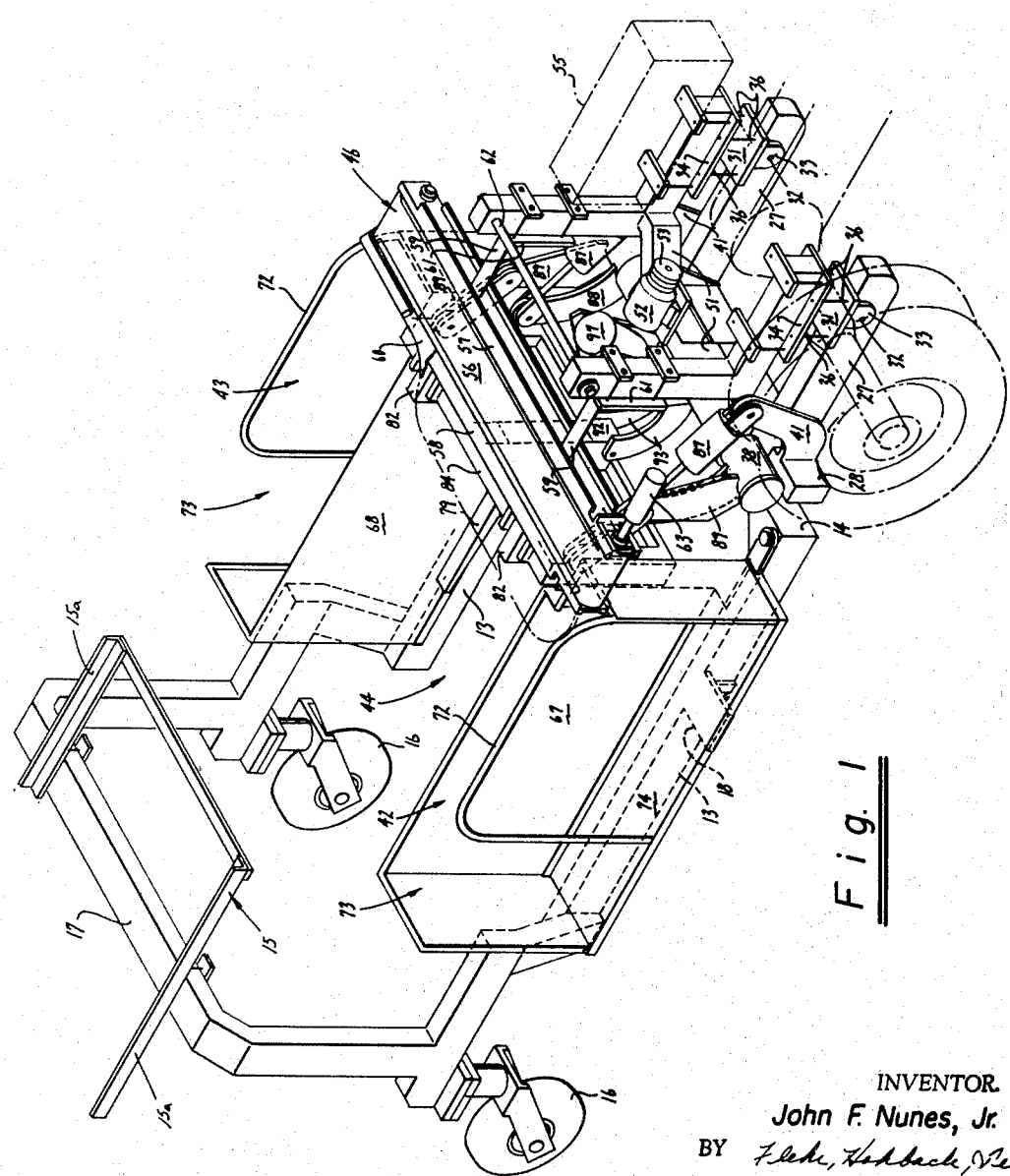

INVENTOR.
John F. Nunes, Jr.
BY Flehr, Hohbach, Test,
Albritton & Herbert
Attorneys

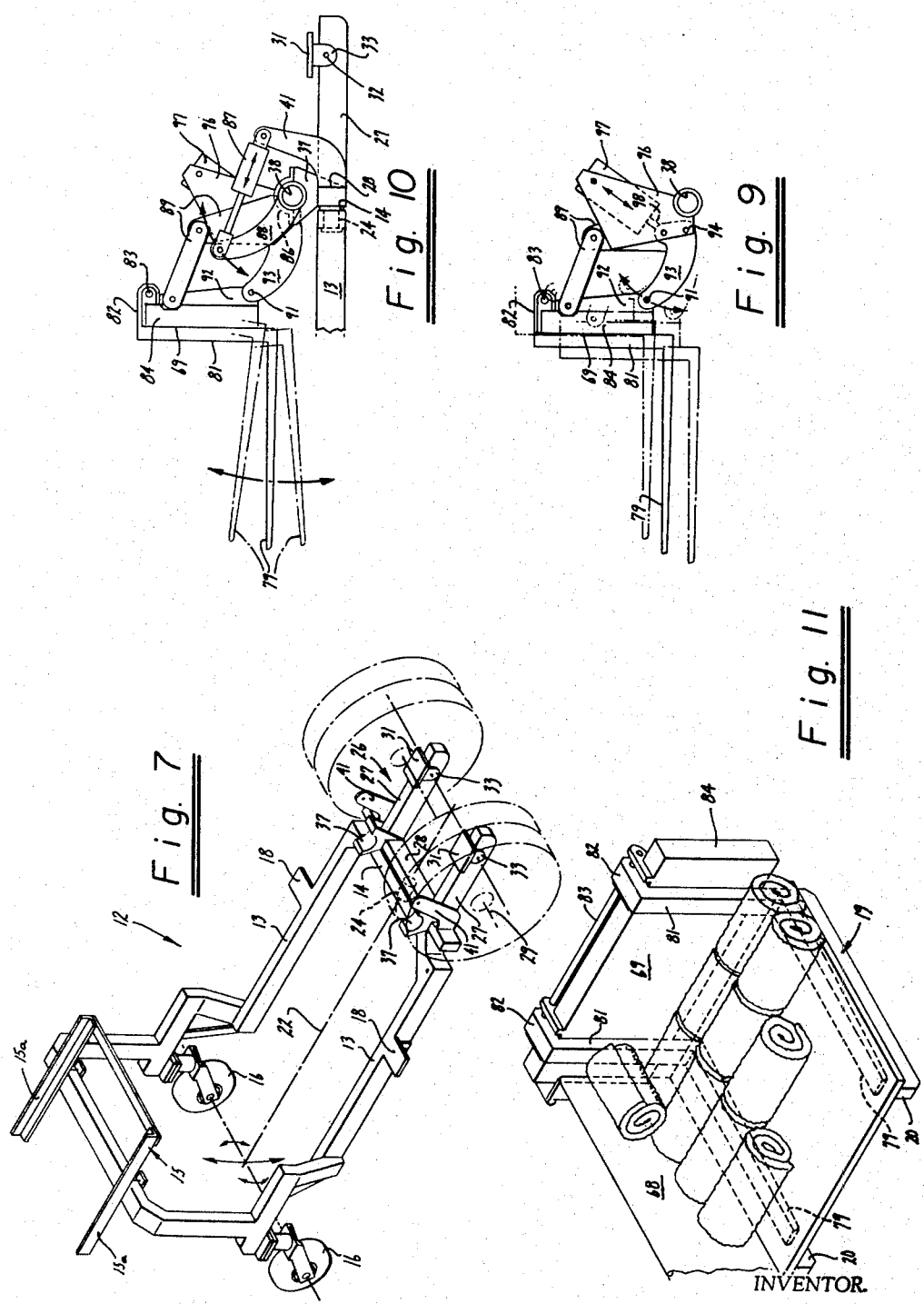

United States Patent Office 3,415,399
Patented Dec. 10, 1968

3,415,399
PALLET CARRIER VEHICLE FOR
MOBILIZED LOADING OF SAME
John F. Nunes, Jr., Rte. 1, P.O. Box 166,
Patterson, Calif. 95363
Filed Apr. 3, 1967, Ser. No. 628,132
9 Claims. (Cl. 214—390)

ABSTRACT OF THE DISCLOSURE

A vehicular apparatus which includes a zone bounded by work stations and upright walls wherein a dischargeable pallet may be loaded by workers in the work station. A transversely extending conveyor carries a commodity to be loaded onto the pallets. The conveyor is disposed within ready reach of the workers by supporting and coupling the trailer to the tractor by means which eliminates lateral articulation between the trailer and tractor. A supply of pallets is also carried within ready reach of the workers at the work stations.

This invention relates to vehicular apparatus of a type adapted to receive commodities for loading onto dischargeable pallets carried by the vehicle.

The apparatus is particularly useful in stacking harvested sod. Apparatus for lifting short lentghs of sod from the ground and for rolling same into generally cylindrical form is shown in my copending application Ser. No. 437,511, filed Mar. 5, 1965.

The present pallet carrier apparatus is adapted to receive rolls of sod discharged from apparatus of the above type whereby the rolls of sod can be stacked upon a pallet carried in, and later discharged from, the present vehicular apparatus.

It is a general object of the present invention to provide an improved vehicle adapted to carry a removable pallet which is readily dischargeable and adapted to be stacked with a commodity of a type, for example, such as sod.

Another object of the invention is to provide a vehicle of a type arranged to discharge each loaded pallet with as little disturbance to the materials stacked thereon as possible.

Another object of the invention is the provision of a vehicle of the kind described including work stations adjacent an accumulation zone wherein the commodity is stacked onto a pallet and wherein the apparatus is arranged so that the work stations will be within comfortable and easy reach of conveyor means presenting the commodity to the worker at such work stations.

Yet another object of the invention is the provision of vehicular apparatus of the kind described whereby workers at the work stations need handle only those commodities successfully passing a visual inspection given them by the workers at the work stations. Those commodities which fail such inspection are permitted to be discharged from the apparatus without any further handling by the workers.

Still another object of the invention is the provision of vehicular apparatus of the kind described wherein a commodity loaded upon the pallet is carried upon a fork-lift mechanism supported upon four wheels whereby no deadweight for counterbalancing need be employed.

These and other objects of the invention shall become more readily apparent from the following detailed description of a preferred embodiment of the invention when considered in conjunction with the accompanying drawings.

In general, there is disclosed herein vehicular apparatus of a type adapted to receive, carry and discharge commodities, such as sod, for example. The apparatus includes a vehicular frame rollably supported for movement across a support surface, such as the terrain of a field, and means carried by the frame to form a loading zone adapted to receive and accumulate commodities therein, hereinafter referred to as an accumulation zone.

The bottom of the accumulation zone is defined by a removable platform, preferably a pallet. The pallet is supported and lowered by apparatus, movable between raised and lowered positions to removably discharge each loaded platform, such as a pallet. Commodities are placed on the platform aided by means defining upstanding walls bounding the sides and leading end of the accumulation zone whereby commodities may be positioned in registration against such walls. The accumulation zone is unobstructed to the rear and the side walls are movable between a normally projected position maintained during loading of the platform and a retracted position which serves to laterally enlarge the accumulation zone during discharge of the loaded platform.

Means for moving the supporting and lowering apparatus to its lowered position serves to discharge the loaded platform merely by placing it on the ground and driving out from under it. Thus, the loaded platform is discharged rearwardly from the accumulation zone as means are actuated for moving the side walls to their retracted positions laterally withdrawing the side walls away from the accumulation zone during discharge. In the foregoing manner commodities on the platform are less likely to be disturbed during discharge of the loaded pallet so that it remains fully loaded.

In the foregoing apparatus there is generally further provided a pair of work stations outboard of the side walls. Each work station is adapted to carry a worker for loading the pallet. Conveyor means for presenting commodities within easy reach of the worker at each of the work stations whereby he can load commodities into the accumulation zone have been provided. The conveyor means is arranged to be unobstructed at its terminal and so as to permit those commodities remaining on the conveyor as they arrive at the terminal end to be discharged therefrom free of further handling. In short, as sod passes through the visual inspection of workers in the work stations, if the sod is defective or unsuitable for loading it is merely permitted to remain on the conveyor to be discharged from the unobstructed end of the conveyor to be returned back to the field.

In general, in order to permit a closely spaced relation between the work stations and the conveyor means whereby workers at the work stations can easily reach sod on the conveyor, where the pallet carrier vehicle apparatus is coupled to a hauling vehicle, such as a tractor, the carrier vehicle has been coupled by means substantially precluding articulation therebetween in a direction laterally of the direction of movement of the vehicle. Caster wheels are provided at the rear of the pallet carrier vehicle whereby as the hauling vehicle is turned to change course, the rear of the pallet carrier vehicle is free to swing out of the line of movement of the hauling vehicle.

Additionally, a pallet storage station, also within reach of workers in the work stations, serves to provide a supply of pallets for use individually within the accumulation zone.

Further, it should be readily appreciated that the provision of a load of considerable weight to the rear of a hauling vehicle might otherwise require the addition of the deadweight of a counterbalance at the front end of the hauling vehicle. However, as disclosed herein, the load carried by the pallet carrier vehicle is supported upon four wheels, two of which are the caster wheels mentioned previously and the other two of which are the rear wheels of the tractor.

A detailed description of the foregoing general arrangement proceeds as now to be described with reference to the drawings, in which:

FIGURE 1 is a perspective view of a pallet carrier vehicle apparatus according to the invention;

FIGURE 2 is a side elevation view of a pallet carrier vehicle apparatus shown in conjunction with a hauling vehicle, such as a tractor;

FIGURE 3 is a plan view of a portion of FIGURE 2 showing a pallet carrier vehicle in conjunction with a portion of the tractor;

FIGURE 4 is a plan view similar to FIGURE 3 with portions of the transversely extending commodity conveyor removed for clarity and showing the work stations moved to their retracted positions clear of contact with a stacked pallet for aiding the discharge of a pallet from the accumulation zone defined therebetween;

FIGURE 5 is an end elevation view in section taken along the line 5—5 of FIGURE 2;

FIGURE 7 is a perspective view showing the framework of a pallet carrier vehicle according to the invention;

FIGURE 8 is a perspective view of lifting mechanism for operating a fork-lift construction in the accumulation zone of the pallet carrier vehicle apparatus;

FIGURES 9 and 10 are diagrammatic detailed views respectively showing mechanism for raising and lowering the fork-lift apparatus of FIGURE 8 and for tipping the tines thereof relative to the horizontal; and FIGURE 11 shows a preferred form of pallet used herein and stacked with rolls of sod thereon.

Figure 6:
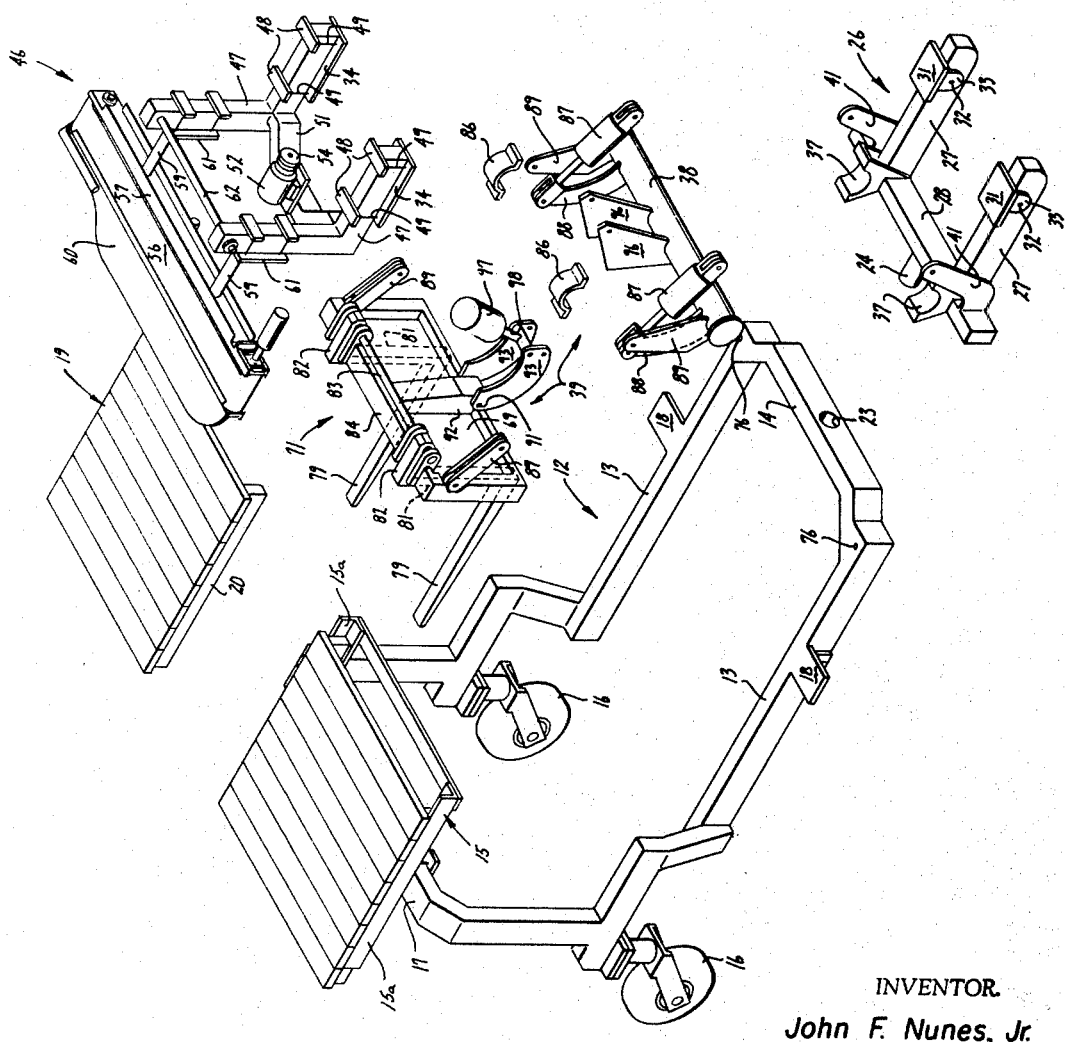
FIGURE 6 is an exploded perspective view of the pallet carrier vehicle apparatus according to the invention.

A vehicular chassis or frame assembly 12 includes a generally U-shaped member comprised of a pair of parallel, spaced bars 13 joined at one end by a transversely extending rocker bar 14. The trailing end of each bar 13 includes a stepped portion arranged to accommodate a caster wheel 16 journaled to swivel about an upright axis. An inverted U-shaped spaced member 17 joins the trailing ends of bars 13. Each bar 13 further includes a support pad 18 adapted to underlie and support work stations disposed thereon.

A storage station for supporting platforms, such as pallets 19, of a type having ground engaging skids 20 is formed by a framework 15 bolted to member 17 by means of the pair of straps or plates 30 underlying angle bars 15a.

Frame assembly 12 is arranged to be coupled to a hauling vehicle, such as tractor 21, whereby frame assembly 12 can rock about a longitudinal axis 22 while introducing no significant articulation laterally of the direction of movement (as defined by axis 22) for reasons that will become more clearly apparent from the description further below. Thus, rocker bar 14 includes a bearing opening 23 disposed to receive journal pin 24 on axis 22.

A coupling assembly 26 adapted to be attached to a tractor 21 or other hauling vehicle for drawing frame, assembly 12 includes a pair of longitudinally extending, laterally spaced members 27 secured, as by welding, to a transversely extending drawbar 28. Journal pin 24 is integrally carried to extend rearwardly from the rear surface of drawbar 28.

Coupling assembly 26 is adapted to be clamped on to the rear axle 29 of tractor 21 to provide articulation between frame assembly 12 and tractor 21 in an upright plane through axis 22. Thus, a pair of hinged pads 31 are carried on the upper side of members 27. Pads 31 pivot about hinge pins 32 extending through ears 33 depending downwardly from each of pads 31.

In order to clamp coupling assembly 26 onto axle 29, a clamping plate 34 is adapted to ride on the upper side of axle 29 and, by suitable means, such as bolts 36, each pad 31 and its associated clamping plate 34 may be drawn tightly together about axle 29.

Coupling assembly 26 has been further provided with a pair of laterally spaced cradle blocks 37 adapted to carry and support a cross-tube 38 forming a portion of a forklift style pallet support and lowering assembly 39. Coupling assembly 26 further includes a pair of upstanding brackets 41 for purposes described further below.

From the foregoing, it will be readily apparent that coupling assembly 26 is adapted to be mounted onto tractor 21 for drawing frame assembly 12 in closely following relation whereby a cyclically driven conveyor assembly 46 can be disposed to receive and carry commodities, such as sod, in a path extending transversely of the vehicle and within easy reach of closely adjacent work station 42, 43. Each station 42, 43 is adapted to carry a worker for loading sod into an accumulation zone 44.

Means for picking sod slabs from the ground and for rolling them into rolls to be discharged onto conveyor assembly 46 is referred to by reference numeral 25 and refers to apparatus of a type as disclosed in my copending application Ser. No. 473,511 suitably modified to be carried alongside tractor 21 rather than being self-propelled.

Means serving to carry conveyor assembly 46 in closely following relation to tractor 21 comprises a pair of upstanding L-shaped supports 47. Supports 47 are adapted to be clamped to tractor axle 29 by means of clamping plates 34 (located between axle 29 and supports 47) and bars 48 across the top of each support 47. In this manner, bolts 49 may be taken up so as to hold supports 47 firmly in place. Supports 47 are joined by a transversely extending spacer bar 51 which carries a fluid pump 52. Pump 52 is belt-coupled via pulley 54 to be driven from a suitable power takeoff 53 of tractor 21.

Conveyor assembly 46 includes a cyclically driven conveyor belt 56, trained about a pair of rollers (not shown) to define a path of sod movement extending transversely of the vehicle and preferably unobstructed at its terminal end. Belt 56 is preferably formed to include a concave trough-like upper reach. Means supporting belt 56 comprises the two end rollers (not shown) journaled for rotation between the ends of a pair of parallel, spaced apart channel-iron frame members 57, 58. Frame member 58 carries an apron 60 forming a temporary resting table to aid workers in handling sod. Frame member 57 is supported by a pair of rods 59 welded thereto and extending longitudinally of the vehicle between frame member 57 and an associated one of a pair of support plates 61 bolted to the upstanding portion of an associated one of L-shaped supports 47. The upper ends of supports 47 are held rigidly spaced apart by a spreader bar 62.

As sod on conveyor belt 56 passes workers in sections 42, 43, it can be visually inspected. Unsatisfactory sod, therefore, will be left upon belt 56 whereby as it reaches the terminal end of the belt it is discharged, without being handled further, back to the field from which it came. Only satisfactory sod is handled.

Means for driving conveyor belt 56 includes a small fluid motor 63 coupled to the end of shaft 64 and operated by pressure supplied via hose connections as from reservoir tank 55.

Means defining upstanding walls bounding the sides and leading end of accumulation zone 44 for positioning commodities in registration thereagainst includes the upstanding side walls 67, 68 for each work station 42, 43, respectively, and an end plate 69 of a pallet support and lowering assembly 71 described more fully hereinafter.

Each work station 42, 43 includes a guard rail 72 to prevent a worker at the work station from inadvertently stepping backwardly off the vehicle. Spacing is provided to form an entrance 73 for access to the station. The bottom of each work station 42, 43 includes a floor 74 which rests upon an associated one of pads 18 as well as upon the upper surface of bars 13.

Work stations 42, 43 move laterally apart between a normally projected position for loading a platform such as a pallet 19, and a retracted position which serves to enlarge zone 44 during discharge of pallet 19 after it has been loaded. Thus, each work station 42, 43 is coupled to a hinge pin 76 for outward pivoting movement. Means for moving each work station 42, 43 includes an actuator 77 (FIGURE 4) having an extensible rod 78 terminating in a clevis connected to a bracket beneath each floor 74.

Pallet support and lowering assembly 71 serves to carry a platform such as pallet 19, whereby pallet 19 defines the bottom of zone 44. After pallet 19 has been loaded with commodities, it is lowered into engagement with the supporting surface (such as the terrain) and the vehicle is then driven out from under pallet 19. During discharge of each pallet, work stations 42, 43 are moved to retracted positions laterally away from zone 44 so as to minimize disturbance of the commodities on pallet 19.

Assembly 71 includes a pair of tines 79 formed to include an upstanding brace portion 81 and a longitudinally extending mounting portion 82 pivotally coupled to a transversely extending rod 83. The rectangular frame 84 supports tines 79. An end plate 69 is secured to frame 84, as by welding, and faces rearwardly to define an upstanding end wall to zone 44.

Frame 84 is arranged to be raised and lowered as well as to be tipped relative to the horizontal by means now to be described.

Means for tipping the plane of tines 79 relative to the horizontal includes cross tube 38 journalled to be rocked in cradle blocks 37 and retained therein by clamps 86. Means for rocking tube 38 includes a pair of fluid actuators 87. Each actuator is pivotally secured at its opposite ends respectively to a rocker arm 88 and one of brackets 41. Each rocker arm 88 is rigidly secured, as by welding, to cross-tube 38. A pair of jointed links 89 serves to transmit the rocking movement of tube 38 to frame 84. Each link is rigidly secured to tube 38 and includes a joint intermediate its ends. The upper ends of links 89 are pivotally coupled to an upper portion of frame 84 whereby a rightward pull (as in FIGURE 10) can be applied thereto upon clockwise rotation of tube 38.

The bottom of frame 84 is pivotally supported by a connecting pin 91 coupled to a support block 92. Block 92 is rigidly formed onto the rear side of plate 69 and secured to frame 84. Block 92 rides between a pair of arms 93, serving to lift or lower frame 84. The lower ends of arms 93 are pivotally coupled by a pin 94 (FIGURE 9) carried between a pair of laterally spaced mounting plates 96. Mounting plates 96 are rigidly connected, as by welding, to tube 38. Thus, clockwise rotation of tube 38, when applying the rightward pull to the upper portion of frame 84, causes frame 84 to pivot about connecting pin 91.

Means for raising and lowering tines 79 includes a fluid actuator 97 pivotally carried at its upper end between mounting plates 96. A piston rod 98 is pivotally coupled between lobes formed along the upper edge of each arm 93.

As thus arranged, the operation of actuator 97 serves to rotate arms 93 about pin 94 so as to carry tines 79 between raised and lowered positions, as best illustrated by phantom lines in FIGURE 9.

Suitable hose connections leading from pump 52 supply fluid under pressure to a reservoir tank 55 whereby additional hose connections can be coupled to drive motor 63 and operate actuators 77, 87, 97. Controls for operating each actuator 77, 87, 97 as well as fluid motor 63 are conventional and are not shown for purposes of clarity. These controls have been located conveniently, whereby they can be operated by workers at work stations 42, 43.

Operation of the apparatus as described above proceeds generally as follows when handling a commodity, for example, such as sod. A pallet 19 is first removed from framework 15 and positioned upon tines 79 to define the bottom of accumulation zone 44.

In general, a suitable sod harvesting conveyor apparatus 25 of a type, for example, as shown in the above identified patent application, is mounted to be drawn alongside tractor 21. The aforementioned harvesting apparatus serves to pick up each slab of sod and carry it into a sod rolling assembly which discharges each roll of sod onto the transverse conveyor belt 56.

A worker at work station 43 visibly inspects the sod. If it is satisfactory, he removes it from conveyor 56 and places it upon a pallet 19 previously laid upon tines 79. The tines 79 are initially in their raised position. An end of the first roll of sod being handled by the worker in work station 43 is positioned in registration against wall 68. The side of the first roll is lodged in engagement with wall 69. Similarly, the first roll of sod handled by a worker at station 42 is disposed upon pallet 19 in a manner whereby an end of the roll is positioned in registration against wall 67 and the side of the roll is placed against end wall 69.

After a first layer of sod has been placed upon pallet 19, the direction of their orientation is shifted 90° whereby the ends of the rolls are placed against wall 69 and the sides of the rolls bear against the side walls 67, 68 defining zone 44. Thus, the orientation of the sod in alternate adjacent layers is arranged at right angles to each other.

After pallet 19 has been fully loaded through operation of the controls, the loaded pallet is lowered until the downwardly depending skids 20 engage the ground or other vehicle support surface. At that time the controls for operating actuator 77 are conditioned to withdraw walls 67, 68 from zone 44 and the apparatus is driven forwardly whereby the loaded pallet passes through the unobstructed end portion of zone 44 and beneath the arch of member 17.

During loading of pallet 19, the orientation of tines 79 may be suitably controlled relative to the horizontal to compensate for any downward tipping caused by the additional weight.

During loading of each pallet 19, any unsatisfactory sod which is found by a worker at stations 42 or 43 will be permitted to remain on conveyor belt 56 whereby it is discharged from the unobstructed terminal end thereof back to the field from which it was harvested. In this manner, only good sod is handled by the workers, and the individual workers handle only half of the sod presented.

By using caster wheels 16 and eliminating lateral articulation between tractor 21 and the pallet carrier, the commodity can be presented on a transverse conveyor positioned within easy reach of each worker at work stations 42, 43 so as to minimize the muscular exertion which is required. For momentarily resting the sod, for example, to re-grip it, the worker can lift the roll onto apron 60, re-grip the roll and then place it onto pallet 19.

From the foregoing, it will be readily evident that there has been provided an improved commodity carrier vehicle adapted particularly advantageously for handling harvested commodities such as sod delivered to it by suitable means whereby pallets can be loaded and discharged in simple fashion rearwardly thereof with little or no disturbance to the commodity loaded upon the pallet.

What is claimed is:

1. Vehicular apparatus of a type adapted to receive, carry and discharge commodities, said apparatus comprising a vehicular frame rollably supported for movement across a support surface, means forming an accumulation zone for receiving commodities therein, said means including platform supporting means movable between raised and lowered positions and adapted to removably support a platform adapted to receive commodities thereon and defining a removable bottom to said zone, means defining upstanding walls bounding the sides and leading end of said zone for positioning commodities in registration thereagainst, said zone being unobstructed rearwardly thereof, said side walls being movable between a normally projected position during loading of said platform and a retracted position to enlarge said zone during discharge of said platform, means for moving the supporting means to said lowered position to discharge said platform rearwardly from said zone to said support surface, and means for moving said side walls to said retracted positions to laterally withdraw the side walls away from said zone during discharge of said platform.

2. Vehicular apparatus of a type adapted to receive, carry and discharge commodities, said apparatus comprising a vehicular frame rollably supported for movement across a support surface, means forming an accumulation zone for receiving commodities therein, said means including platform supporting means movable between raised and lowered positions and adapted to removably support a platform thereon defining a removable bottom to said zone, means defining upstanding walls bounding the sides and leading end of said zone for positioning commodities in registration thereagainst, said zone being unobstructed rearwardly thereof, means forming work stations outboard of said side walls adapted to carry a worker therein for loading said platform, means for presenting commodities within reach of a worker at said work stations whereby a worker can load commodities into said zone onto said platform, said side walls being movable between a normally projected position during loading of said platform and a retracted position to enlarge said zone during discharge of said platform, means for moving the platform supporting means to said lowered position to discharge said platform rearwardly from said zone to said support surface, and means for moving said side walls to said retracted positions to laterally enlarge said zone during discharge of said platform.

3. Apparatus according to claim 2 wherein said commodity presenting means includes a cyclically driven conveyor disposed and adapted to receive and carry commodities in a path extending transversely of said zone and adjacent said work stations.

4. Apparatus according to claim 3 wherein the terminal end of said path is unobstructed to permit those commodities remaining on said conveyor at said terminal end to be discharged therefrom free of further handling.

5. Apparatus according to claim 2 wherein said commodity presenting means includes a conveyor disposed and adapted to receive and carry commodities in a path extending transversely of said zone and adjacent said work stations, means adapted to be supported by a hauling vehicle and serving to carry said conveyor in closely following relation thereto, and means adapted to couple said frame to the hauling vehicle substantially free of articulation between the hauling vehicle and said frame laterally of the direction of movement of the vehicle.

6. Vehicular apparatus of a type adapted to receive and carry commodities, said apparatus comprising a vehicular frame rollably supported for movement across a support surface, means forming an accumulation zone for receiving commodities therein, means defining upstanding walls bounding the sides and leading end of said zone, means forming work stations outboard of said side walls adapted to carry a worker therein for loading said zone, means for presenting commodities within reach of a worker at said work stations whereby a worker can load the commodities into said zone, the last named means including a conveyor disposed and adapted to receive and carry commodities in a path extending transversely of said zone and adjacent said work stations, means adapted to be supported by a hauling vehicle and serving to carry said conveyor in closely following relation thereto, and means adapted to couple said frame to the hauling vehicle substantially free of articulation between the hauling vehicle and said frame laterally of the direction of movement of the vehicle.

7. Apparatus according to claim 6 wherein said frame is adapted to be supported at the forward end thereof, via the last named means, by wheels of the hauling vehicle, and a pair of caster wheels supporting the rear of said frame for rolling movement across said supporting surface.

8. Vehicular apparatus of a type adapted to receive and carry commodities, said apparatus comprising a vehicular frame rollably supported for movement across a support surface, means forming an accumulation zone for receiving commodities therein, means defining upstanding walls bounding the sides and leading end of said zone, means forming work stations outboard of said side walls adapted to carry a worker therein for loading said zone, means for presenting commodities within reach of a worker at said work stations whereby a worker can load the commodities into said zone, the last named means including a conveyor disposed and adapted to receive and carry commodities in a path extending transversely of said zone and adjacent said work stations, a hauling vehicle having a rear axle, means supported by said axle and serving to carry said conveyor in closely following relation thereto, and means serving to couple said frame to the hauling vehicle substantially free of articulation between the hauling vehicle and said frame laterally of the direction of movement of the vehicle.

9. Vehicular apparatus as defined in claim 1 further including means carried by said vehicular frame and forming a storage station adapted to support a plurality of pallets stacked thereon, said station serving to dispose said pallets within ready reach of workers in said work station.

References Cited

UNITED STATES PATENTS

| 2,547,269 | 4/1951 | Kinsey | 214—390 |
| 2,825,573 | 3/1958 | Shaw et al. | 214—83.1 XR |

ALBERT J. MAKAY, *Primary Examiner.*

U.S. Cl. X.R.

214—83.1; 56—391; 171—20; 172—431